United States Patent
Uhrich et al.

(10) Patent No.: US 9,541,469 B2
(45) Date of Patent: *Jan. 10, 2017

(54) NON-INTRUSIVE EXHAUST GAS SENSOR MONITORING

(71) Applicant: Ford Global Technologies, LLC, Dearborn, MI (US)

(72) Inventors: Michael James Uhrich, West Bloomfield, MI (US); Adam Nathan Banker, Canton, MI (US); James Michael Kerns, Trenton, MI (US); Imad Hassan Makki, Dearborn Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 100 days.

This patent is subject to a terminal disclaimer.

(21) Appl. No.: 14/572,076

(22) Filed: Dec. 16, 2014

(65) Prior Publication Data
US 2015/0101582 A1 Apr. 16, 2015

Related U.S. Application Data

(63) Continuation of application No. 13/410,171, filed on Mar. 1, 2012, now Pat. No. 8,924,130.

(51) Int. Cl.
| | | |
|---|---|---|
| F02D 41/22 | (2006.01) |
| G01M 15/10 | (2006.01) |
| F01N 11/00 | (2006.01) |
| F02D 41/12 | (2006.01) |
| F02D 41/14 | (2006.01) |
| F02D 41/30 | (2006.01) |

(52) U.S. Cl.
CPC .......... *G01M 15/104* (2013.01); *F01N 11/007* (2013.01); *F02D 41/123* (2013.01); *F02D 41/1481* (2013.01); *F02D 41/3017* (2013.01); *F01N 2550/20* (2013.01); *F01N 2560/025* (2013.01); *Y02T 10/47* (2013.01)

(58) Field of Classification Search
CPC . G01M 15/104; F02D 41/3017; F02D 41/123; F02D 41/1481; F01N 11/007; F01N 2560/025; F01N 2550/20
USPC ....... 123/325, 332, 672, 675, 688, 690, 443; 60/277; 73/114.69, 114.71, 114.72, 73/114.73; 701/109
See application file for complete search history.

(56) References Cited

U.S. PATENT DOCUMENTS

| | | |
|---|---|---|
| 7,006,909 B1 | 2/2006 | May |
| 7,040,307 B2 | 5/2006 | Nagashima et al. |
| 8,145,409 B2 | 3/2012 | Kerns et al. |
| 8,958,974 B2 | 2/2015 | Makki et al. |

(Continued)

OTHER PUBLICATIONS

Partial Translation of Office Action of Chinese Application No. 2013100651525, Issued May 16, 2016, State Intellectual Property Office of PRC, 7 Pages.

*Primary Examiner* — Hai Huynh
(74) *Attorney, Agent, or Firm* — Julia Voutyras; Alleman Hall McCoy Russell & Tuttle LLP

(57) ABSTRACT

A method for monitoring an exhaust gas sensor coupled in an engine exhaust is provided. In one embodiment, the method comprises indicating exhaust gas sensor degradation based on a time delay and line length of each sample of a set of exhaust gas sensor responses collected during a commanded change in air-fuel ratio. In this way, the exhaust gas sensor may be monitored utilizing robust parameters in a non-intrusive manner.

21 Claims, 6 Drawing Sheets

(56) References Cited

U.S. PATENT DOCUMENTS

| | | | |
|---|---|---|---|
| 9,074,513 B2 * | 7/2015 | Makki | F01N 11/00 |
| 9,169,795 B2 * | 10/2015 | Jammoussi | F02D 41/30 |
| 9,188,045 B2 * | 11/2015 | Banker | F01N 11/007 |
| 2006/0037305 A1 | 2/2006 | Nagashima et al. | |
| 2009/0112441 A1 | 4/2009 | Perschl et al. | |
| 2011/0132341 A1 | 6/2011 | Magner et al. | |
| 2013/0180509 A1 | 7/2013 | Makki et al. | |
| 2013/0231847 A1 | 9/2013 | Uhrich et al. | |
| 2014/0067235 A1 | 3/2014 | Banker et al. | |

\* cited by examiner

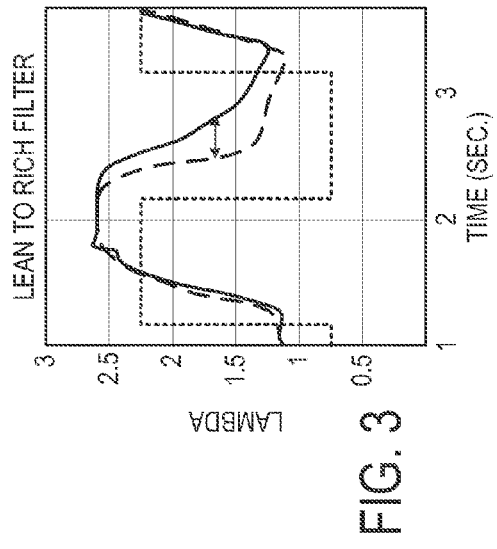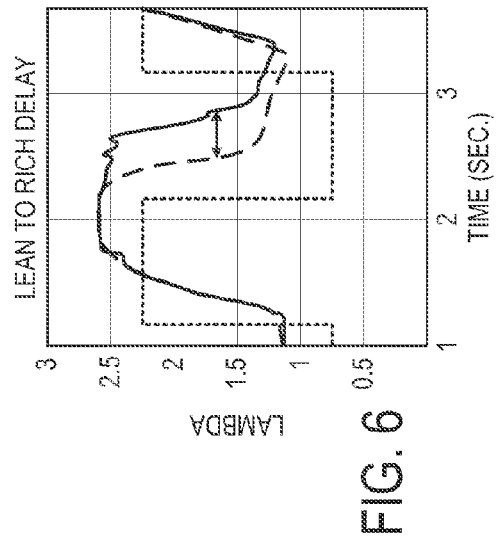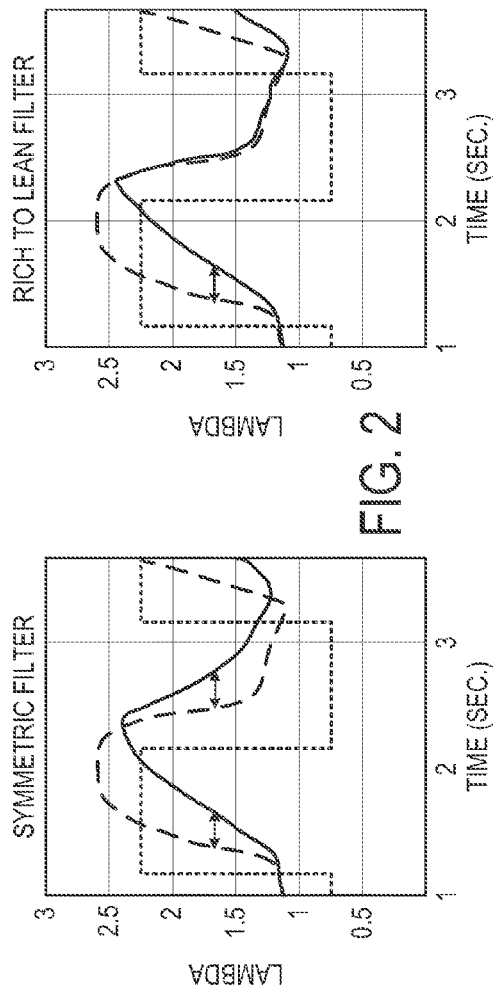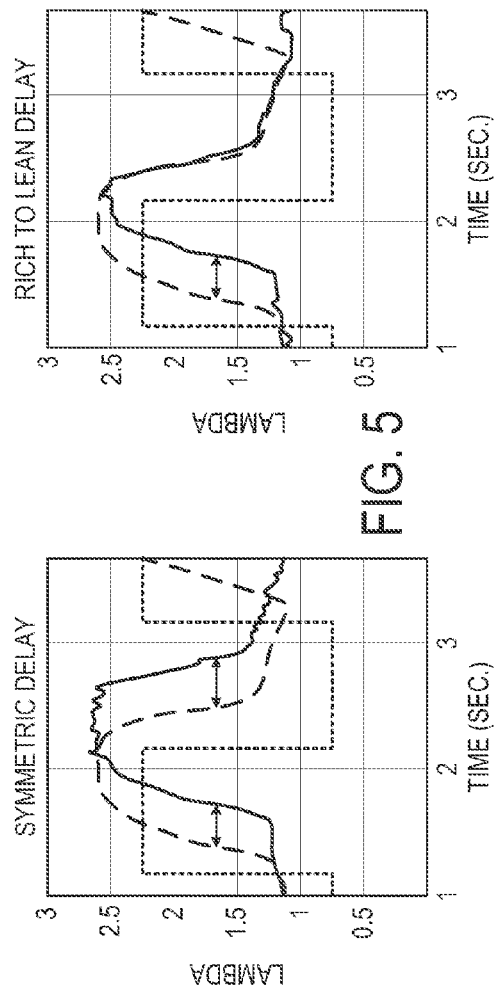
FIG. 2 SYMMETRIC FILTER
FIG. 3 RICH TO LEAN FILTER
FIG. 4 LEAN TO RICH FILTER
FIG. 5 SYMMETRIC DELAY
FIG. 6 RICH TO LEAN DELAY
FIG. 7 LEAN TO RICH DELAY
·········· COMMANDED LAMBDA    – – – EXPECTED LAMBDA    ——— DEGRADED LAMBDA

NON-INTRUSIVE EXHAUST GAS SENSOR MONITORING

CROSS REFERENCE TO RELATED APPLICATIONS

The present application is a continuation of U.S. patent application Ser. No. 13/410,171, entitled "NON-INTRUSIVE EXHAUST GAS SENSOR MONITORING," filed on Mar. 1, 2012, the entire contents of which are hereby incorporated by reference for all purposes.

FIELD

The present disclosure relates to an exhaust gas sensor in a motor vehicle.

BACKGROUND AND SUMMARY

An exhaust gas sensor may be positioned in an exhaust system of a vehicle to detect an air/fuel ratio of exhaust gas exhausted from an internal combustion engine of the vehicle. The exhaust gas sensor readings may be used to control operation of the internal combustion engine to propel the vehicle.

Degradation of an exhaust gas sensor may cause engine control degradation that may result in increased emissions and/or reduced vehicle drivability. Accordingly, accurate determination of exhaust gas sensor degradation may reduce the likelihood of engine control based on readings from a degraded exhaust gas sensor. In particular, an exhaust gas sensor may exhibit six discrete types of degradation behavior. The degradation behavior types may be categorized as asymmetric type degradation (e.g., rich-to-lean asymmetric delay, lean-to-rich asymmetric delay, rich-to-lean asymmetric filter, lean-to-rich asymmetric filter) that affects only lean-to-rich or rich-to-lean exhaust gas sensor response rates, or symmetric type degradation (e.g., symmetric delay, symmetric filter) that affects both lean-to-rich and rich-to-lean exhaust gas sensor response rates. The delay type degradation behaviors may be associated with the initial reaction of the exhaust gas sensor to a change in exhaust gas composition and the filter type degradation behaviors may be associated with a duration after an initial exhaust gas sensor response to transition from a rich-to-lean or lean-to-rich exhaust gas sensor output.

Previous approaches to monitoring exhaust gas sensor degradation, particularly identifying one or more of the six degradation behaviors, have relied on intrusive data collection. That is, an engine may be purposely operated with one or more rich to lean or lean to rich transitions to monitor exhaust gas sensor response. However, these excursions may be restricted to particular operating conditions that do not occur frequently enough to accurately monitor the sensor. Further, these excursions may increase engine operation at non-desired air/fuel ratios that result in increased fuel consumption and/or increased emissions. Additionally, large amounts of background noise present in the collected samples may confound accurate determination of the sensor degradation.

The inventors herein have recognized the above issues and identified a non-intrusive approach that utilizes a robust parameter for determining exhaust gas sensor degradation. In one embodiment, a method of monitoring an exhaust gas sensor coupled in an engine exhaust comprises indicating exhaust gas sensor degradation, including asymmetric degradation, based on a time delay and line length of each sample of a set of exhaust gas sensor responses collected during a commanded change in air-fuel ratio.

The exhaust gas sensor time delay and line length may provide a robust signal that has less noise and higher fidelity than previous approaches. In doing so, the accuracy of the sensor degradation determination may be improved. In one example, the commanded change in lambda may be entry into or exit out of deceleration fuel shut-off (DFSO). During entry into DFSO, the engine may be commanded from stoichiometric operation to lean operation, and during exit out of DFSO, the engine may be commanded from lean operation to stoichiometric operation. As such, the exhaust gas sensor time delay and line length may be monitored during conditions that approximate lean-to-rich and rich-to-lean transitions to determine if any of the six discrete sensor degradation behaviors are present without intrusive excursions.

By determining degradation of an exhaust gas sensor using a non-intrusive approach with data collected during DFSO, exhaust gas sensor degradation monitoring may be performed in a simple manner. Further, by using the exhaust gas sensor output to determine which of the seven degradation behaviors the sensor exhibits, closed loop feedback control may be improved by tailoring engine control (e.g., fuel injection amount and/or timing) responsive to indication of the particular degradation behavior of the exhaust gas sensor to reduce the impact on vehicle drivability and/or emissions due to exhaust gas sensor degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a graph indicating a symmetric filter type degradation behavior of an exhaust gas sensor.

FIG. 3 shows a graph indicating an asymmetric rich-to-lean filter type degradation behavior of an exhaust gas sensor.

FIG. 4 shows a graph indicating an asymmetric lean-to-rich filter type degradation behavior of an exhaust gas sensor.

FIG. 5 show a graph indicating a symmetric delay type degradation behavior of an exhaust gas sensor.

FIG. 6 shows a graph indicating an asymmetric rich-to-lean delay type degradation behavior of an exhaust gas sensor.

FIG. 7 shows a graph indicating an asymmetric lean-to-rich delay type degradation behavior of an exhaust gas sensor.

DETAILED DESCRIPTION

The following description relates to an approach for determining degradation of an exhaust gas sensor. More particularly, the systems and methods described below may be implemented to determine exhaust gas sensor degradation based on recognition of any one of six discrete types of behavior associated with exhaust gas sensor degradation. The recognition of the degradation behavior may be performed during entry into or exit out of DFSO to non-intrusively monitor exhaust gas sensor response during rich-to-lean and lean-to-rich transitions. Further, gross air-fuel ratio disturbances that may confound the monitoring, such as a change in fuel vapors present in the intake (due to fuel vapor canister purge, for example) or from closed throttle transition, may be detected to increase accuracy of the degradation indication.

Figure 1:
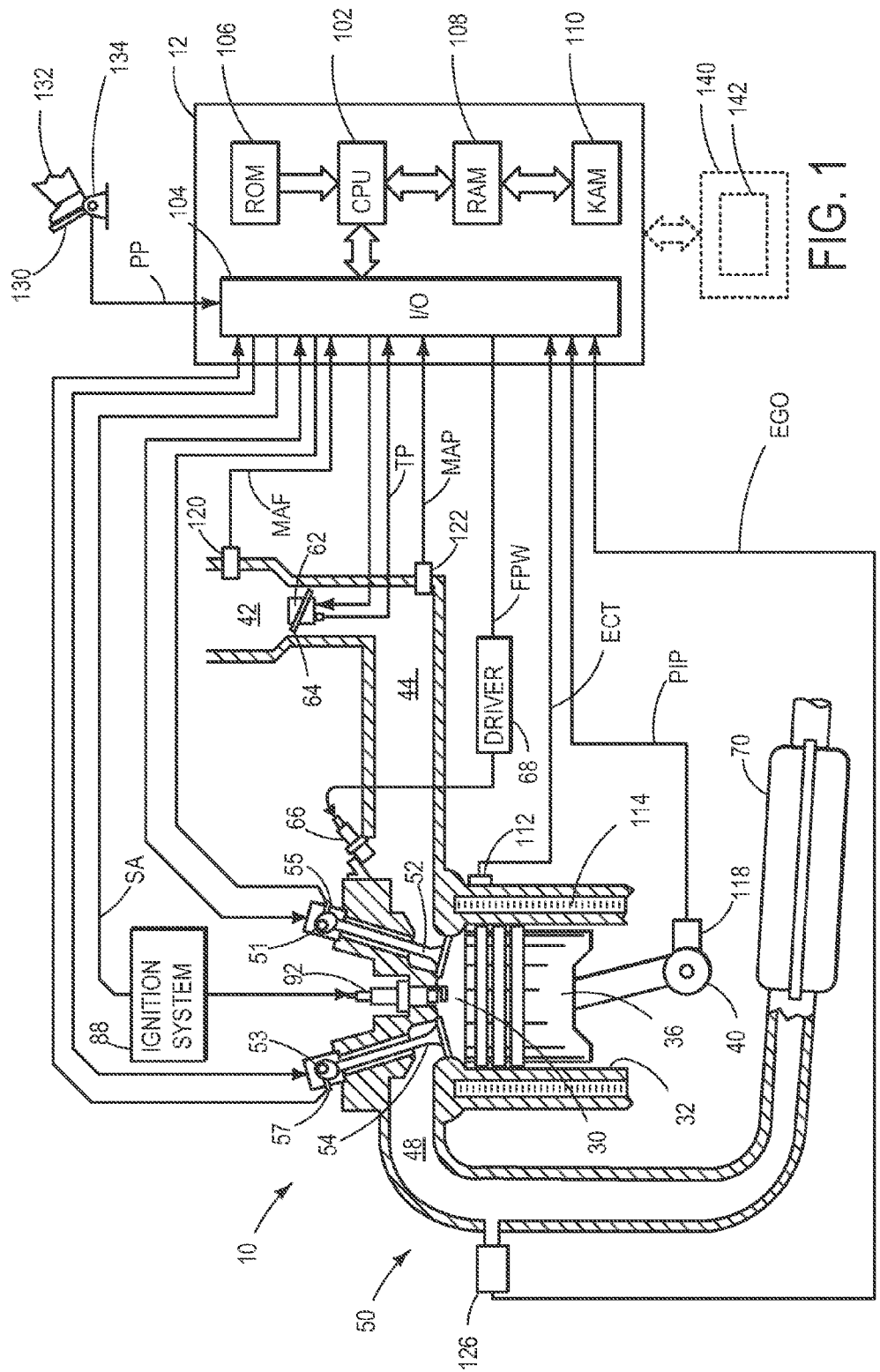
FIG. 1 shows a schematic diagram of an embodiment of a propulsion system of a vehicle including an exhaust gas sensor.
Figure 9:
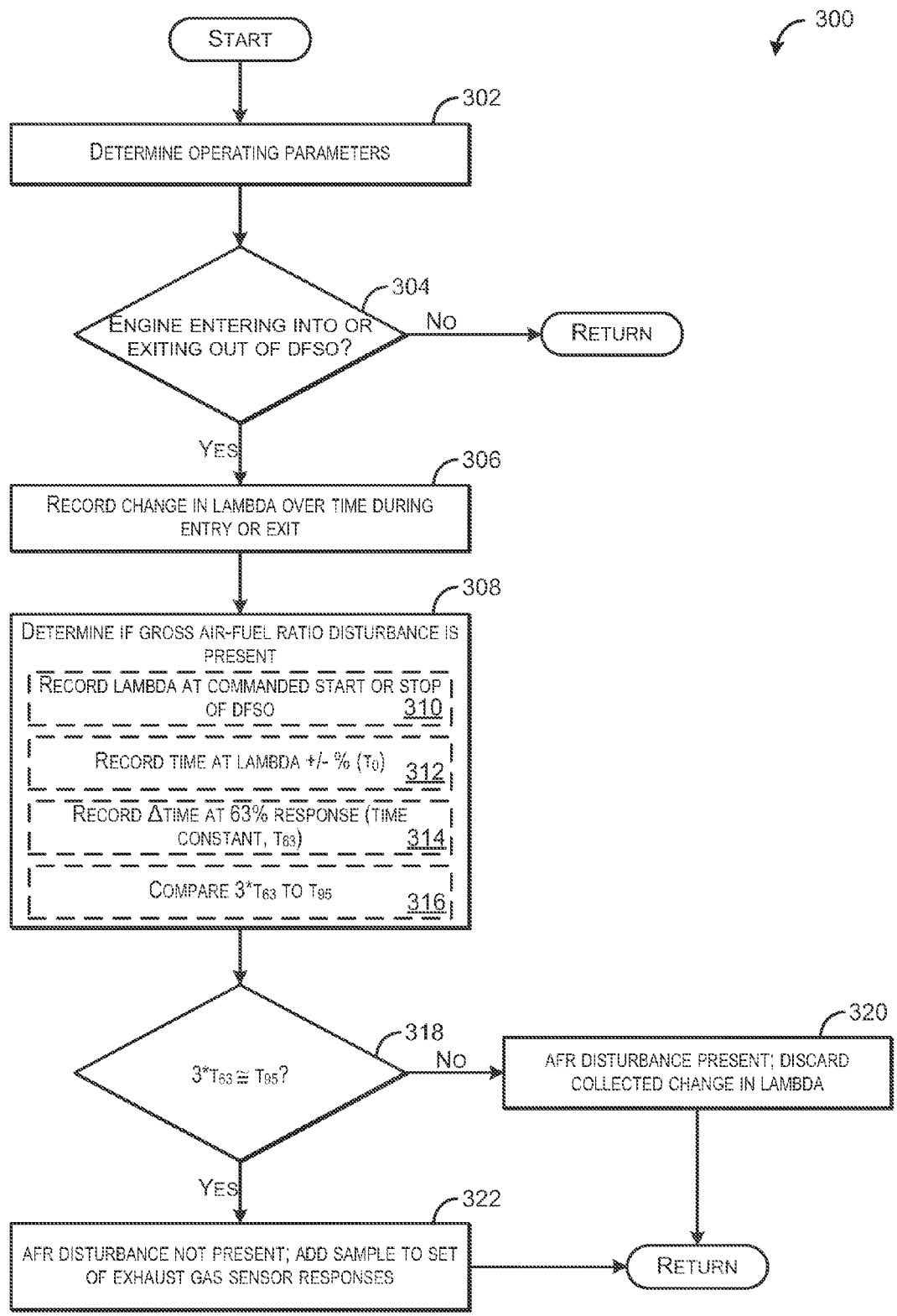
FIG. 9 is a flow chart illustrating a method for indicating an air-fuel ratio disturbance according to an embodiment of the present disclosure.
Figure 10:
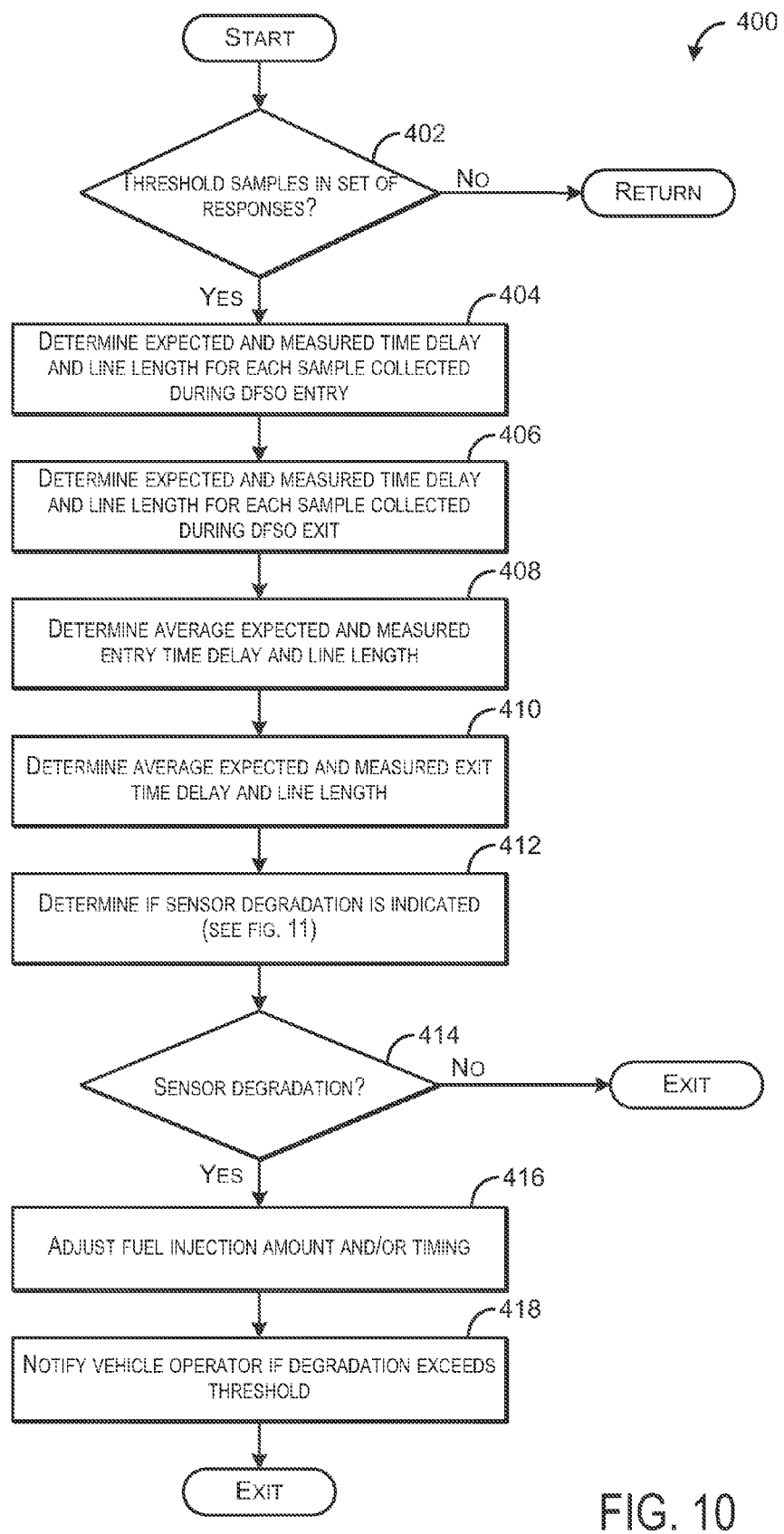
FIG. 10 is a flow chart illustrating a method for monitoring air-fuel ratio during DFSO according to an embodiment of the present disclosure.
Figure 11:
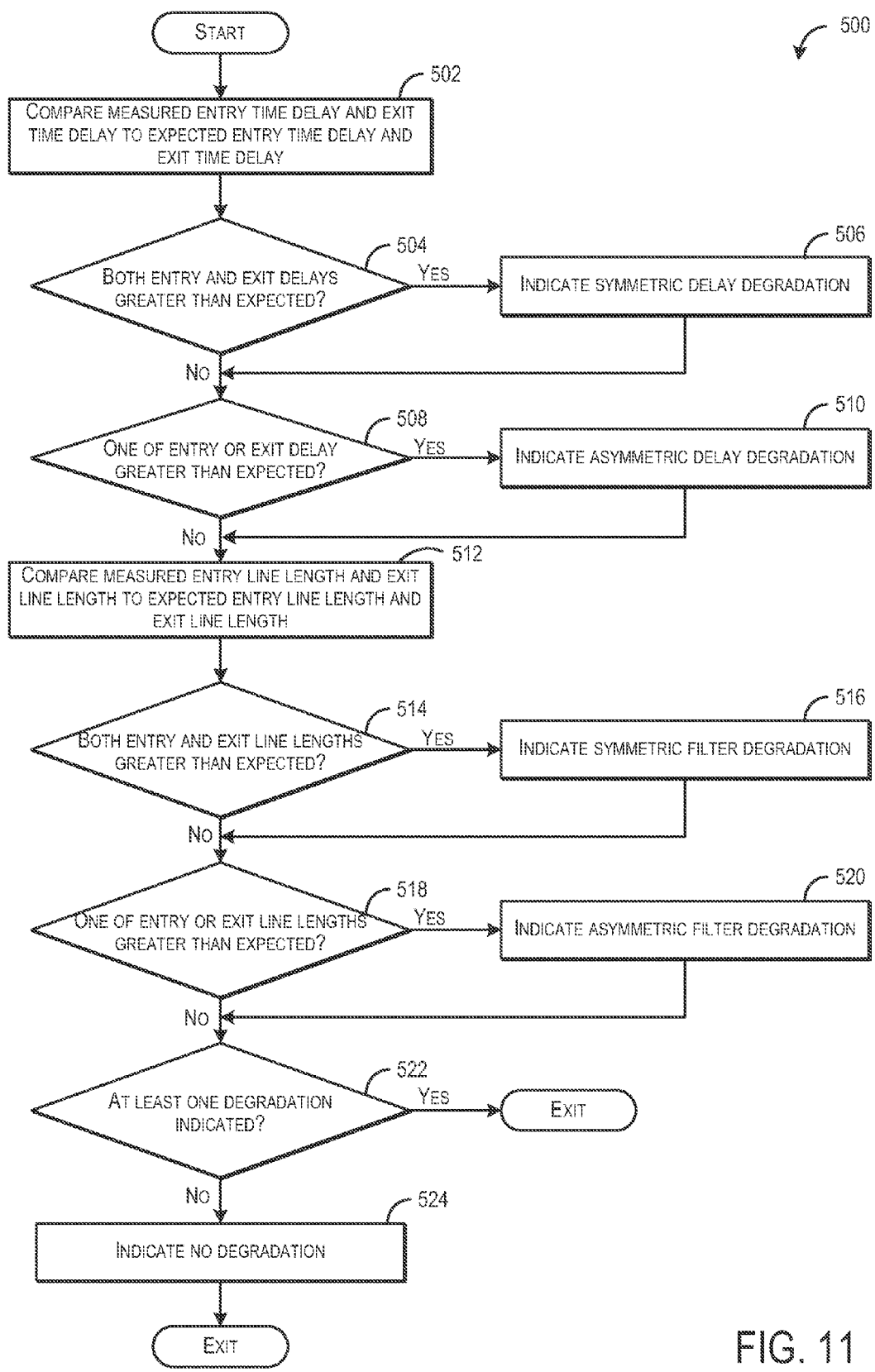
FIG. 11 is a flow chart illustrating a method for indicating exhaust gas degradation according to an embodiment of the present disclosure.

FIG. 1 shows an engine including an exhaust gas sensor. FIGS. 2-8B show expected and degraded lambda for each of the six degradation behaviors of the exhaust gas sensor including a response with an air-fuel ratio disturbance. FIGS. 9-11 are example methods that may be carried out by the engine to determine a degradation behavior.

FIG. 1 is a schematic diagram showing one cylinder of multi-cylinder engine 10, which may be included in a propulsion system of a vehicle in which an exhaust gas sensor 126 may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned downstream of emission control 70.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may used in the exhaust gas sensor degradation determination method described in further detail below. For example, the inverse of the engine speed may be used to determine delays associated with the injection-intake-compression-expansion-exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12.

Note storage medium read-only memory 106 and/or processing resources 142 can be programmed with computer readable data representing instructions executable by processor 102 and/or dedicated controller 140 for performing the methods described below as well as other variants.

As discussed above, exhaust gas sensor degradation may be determined based on any one, or in some examples each, of six discrete behaviors indicated by delays in the response rate of air/fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In the depicted figures, the engine is entering into and exiting out of DFSO. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

FIG. 2 shows a graph indicating a first type of degradation behavior that may be exhibited by a degraded exhaust gas sensor. This first type of degradation behavior is a symmetric filter type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 3 shows a graph indicating a second type of degradation behavior that may be exhibited by a degraded exhaust gas sensor. The second type of degradation behavior is an asymmetric rich-to-lean filter type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

FIG. 4 shows a graph indicating a third type of degradation behavior that may be exhibited by a degraded exhaust gas sensor. The third type of behavior is an asymmetric lean-to-rich filter type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

It will be appreciated that a degraded exhaust gas sensor may exhibit a combination of two or more of the above described degradation behaviors. For example, a degraded exhaust gas sensor may exhibit an asymmetric rich-to-lean filter degradation behavior (i.e., FIG. 3) as well as an asymmetric rich-to-lean delay degradation behavior (i.e., FIG. 6).

Figure 8A:
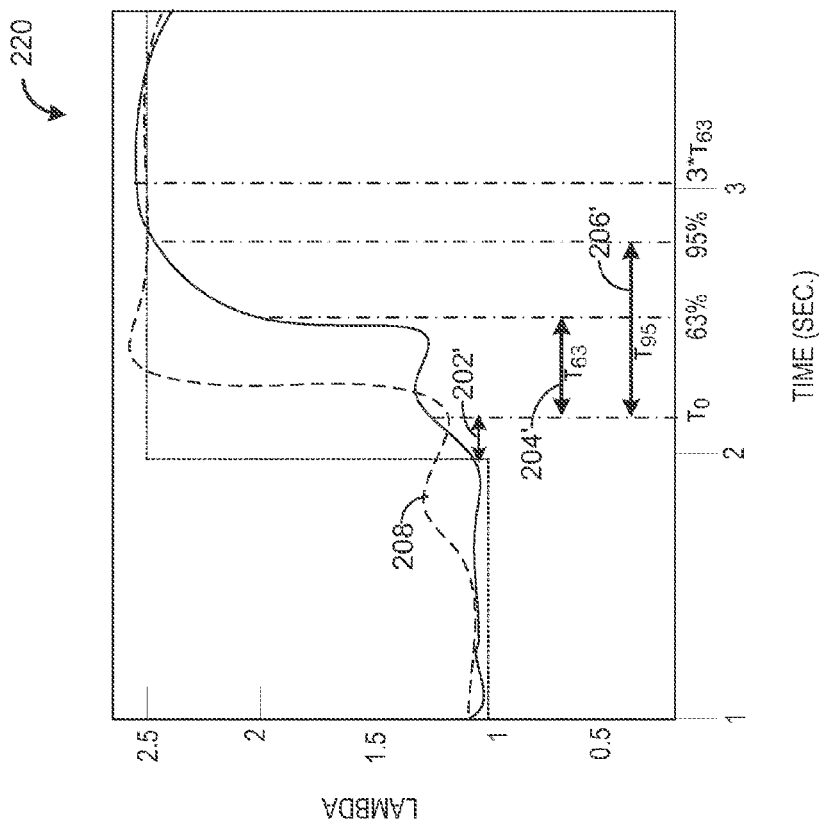
FIG. 8A shows a graph indicating an entry into DFSO without an air-fuel ratio disturbance.
Figure 8B:
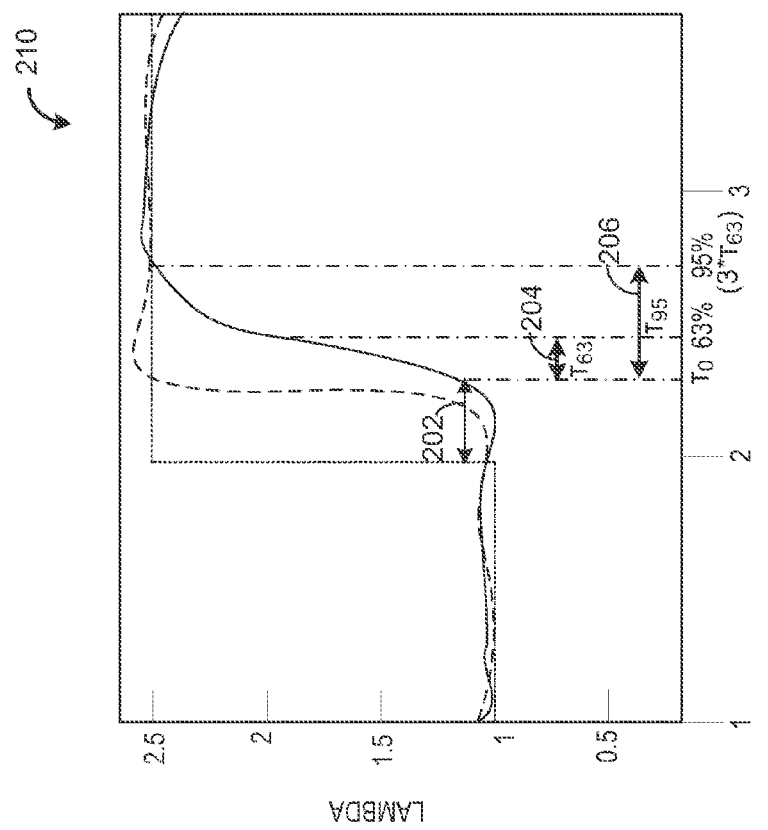
FIG. 8B shows a graph indicating an entry into DFSO with an air-fuel ratio disturbance.

FIGS. 8A and 8B show graphs illustrating an exhaust gas sensor response to a commanded entry into DFSO. FIG. 8A shows a graph 210 illustrating an entry into DFSO without an air-fuel ratio disturbance prior to the entry, and FIG. 8B shows a graph 220 illustrating an entry into DFSO with an air-fuel ratio disturbance prior to the entry. Turning to FIG. 8A, the commanded lambda, expected lambda, and degraded lambda are shown similar to the lambdas described with respect to FIGS. 2-7. FIG. 8A illustrates a rich-to-lean and/or symmetric delay degradation wherein the time delay to respond to the commanded air-fuel ratio change is delayed. The arrow 202 illustrates the time delay, which is the time duration from the commanded change in lambda to a time ($\tau_0$) when a threshold change in the measured lambda is observed. The threshold change in lambda may be a small change that indicates the response to the commanded change has started, e.g., 5%, 10%, 20%, etc. The arrow 204 indicates the time constant ($\tau_{63}$) for the response, which in a first order system is the time from $\tau_0$ to when 63% of the steady state response is achieved. The arrow 206 indicates the time duration from $\tau_0$ to when 95% of the desired response is achieved, otherwise referred to as a threshold response time ($\tau_{95}$). In a first order system, the threshold response time ($\tau_{95}$) is approximately equal to three time constants ($3*\tau_{63}$).

From these parameters, various details regarding the exhaust gas sensor response can be determined. First, the time delay, indicated by arrow 202, may be compared to an expected time delay to determine if the sensor is exhibiting a delay degradation behavior. Second, the time constant, indicated by the arrow 204, may be used to predict a $\tau_{95}$. The predicted $\tau_{95}$ may be compared to a measured $\tau_{95}$ to determine if an air-fuel ratio disturbance is present prior to the entry into DFSO. Specifically, as explained above, the time constant represents the amount of time to achieve 63% of the desired air-fuel ratio, and $\tau_{95}$ can be predicted by multiplying the time constant by three. If the predicted $\tau_{95}$ is not equal to the measured $\tau_{95}$, this indicates a disturbance in the air-fuel ratio, which will be explained in more detail with respect to FIG. 8B. Finally, a line length, indicated by the arrow 206, may be determined based on the change in lambda over the duration of the response, starting at $\tau_0$. The line length is the sensor signal length, and can be used to determine if a response degradation is present. The line length may be determined based on the equation:

$$\text{line length}=E\sqrt{\Delta t^2+\Delta\lambda^2}$$

Turning to FIG. 8B, a graph 220 showing an exhaust gas sensor response during an entry into DFSO including an air-fuel ratio disturbance is depicted. Similar to FIG. 8A, the commanded lambda, expected lambda, and degraded lambda are shown. An air-fuel ratio disturbance, shown in the expected lambda signal at 208, may cause a transient change in the air-fuel ratio that is not commanded by the controller. The air-fuel ratio disturbance may be caused by a fuel vapor canister purge, or other action that results in changes to the fuel present in the cylinders, such as a fuel error due to a closed throttle transition. Air-fuel ratio disturbances may also be caused by transient changes to the air flow into the cylinders. As a result of the disturbance, the determined time delay, indicated by arrow 202', is shorter than the time delay of FIG. 8A. This is because the lambda begins to change just after the commanded entry into DFSO, and hence the measured time between the commanded start of DFSO and when lambda changes by a threshold amount is shortened. As a result of this shortened time delay, the time constant, indicated by arrow 204', is lengthened. Further, the line length, indicated by arrow 206', is also increased compared to the line length of FIG. 8A. Inclusion of this time delay and line length in a degradation determination may result in inaccurate degradation determination. To identify such a disturbance, the predicted $\tau_{95}$ ($3*\tau_{63}$) may be compared to the measured $\tau_{95}$. As shown in FIG. 8B, the predicted $\tau_{95}$, which is three times the determined time constant (arrow 204'), is greater than the measured $\tau_{95}$. If the predicted $\tau_{95}$ is different from the measured $\tau_{95}$ by a threshold amount, such as 10%, the data collected during that commanded change in lambda may be discarded, reducing noise and improving the accuracy of the degradation determination.

FIGS. 9-11 are flow charts depicted methods for monitoring exhaust air-fuel ratio in order to determine if one or more sensor degradation behaviors are present. The exhaust gas air-fuel ratio may be determined by an exhaust gas sensor during a commanded air-fuel ratio change, such as during entry into or exit out of DFSO. However, in some embodiments, other commanded air-fuel ratio changes may be monitored, such as changes due to a catalyst regeneration or other actions. During the commanded AFR change, the lambda as measured by the sensor may be collected as the sensor responds to the commanded change, and the rate at which the sensor responds may be evaluated to determine a time delay and line length for the response. A set of responses may be collected, and the time delays and line lengths for all responses may be averaged and compared to an expected time delay and line length. Further, to improve accuracy of the monitoring, the AFR may be monitored to determine if a disturbance to the AFR occurs prior to the commanded change. If so, the lambda values collected during that commanded change may be discarded, as the AFR disturbance may confound the calculated time delay and line length.

Turning now to FIG. 9 an example method 300 for indicating an air-fuel ratio disturbance is depicted according to an embodiment of the present disclosure. Method 300 may be carried out by a control system of a vehicle, such as controller 12 and/or dedicated controller 140, to monitor air-fuel ratio during a commanded air-fuel ratio change via a sensor such as exhaust gas sensor 126.

At 302, method 300 includes determining engine operating parameters. Engine operating parameters may be determined based on feedback from various engine sensors, and may include engine speed, load, air/fuel ratio, temperature, etc. Further, engine operating parameters may be determined over a given duration, e.g., 10 seconds, in order to determine whether certain engine operating conditions are changing, or whether the engine is operating under steady-state conditions. Method 300 includes, at 304, determining if the engine is entering into or exiting out of deceleration fuel shut-off (DFSO). During DFSO, the engine is operated without fuel injection while the engine rotates and pumps air through the cylinders. DFSO entry and exit conditions may be based on various vehicle and engine operating conditions. In particular, a combination of one or more of vehicle speed, vehicle acceleration, engine speed, engine load, throttle position, pedal position, transmission gear position, and various other parameters may be used to determine whether the engine will be entering or exiting DFSO. In one example, the DFSO entry conditions may be based on an engine speed below a threshold. In another example, the DFSO entry conditions may be based on an engine load below a threshold. In still another example, the DFSO condition may be based on an accelerator pedal position. Additionally or alternatively, entry into DFSO may be determined based on a commanded signal to cease fuel injection. Exit out of DFSO may be based on a commanded signal to begin fuel injection in one example. In another example, a DFSO event may be ended based on a driver tip-in, the vehicle speed reaching a threshold value, and/or engine load reaching a threshold value.

If it is determined at 304 that the engine is not entering or exiting DFSO, method 300 returns to 302 to continue to determine engine operating parameters. If DFSO entry or exit conditions are determined, method 300 proceeds to 306 to record the change in lambda over time during the DFSO entry or exit. When the engine enters or exits DFSO, the commanded air-fuel ratio changes, and the air-fuel ratio detected by the exhaust gas sensor can be stored in the memory of the controller or the dedicated controller during the transition into or out of DFSO. As used herein, the terms entry into and exit out of DFSO may include the time from when a commanded entry or exit is detected until a time when the air-fuel ratio detected by the sensor reaches the steady-state commanded value.

At 308, it is determined if an air-fuel ratio disturbance is present prior to the entry or exit. As explained previously, the air-fuel ratio disturbance may be caused by, for example, additional fuel vapors present in the intake. These disturbances may confound the monitoring of the exhaust gas sensor response to the commanded DFSO entry or exit. In order to detect an AFR disturbance, the lambda at the commanded start or stop of DFSO is recorded at 310. At 312, the time since the start or stop of DFSO at which the lambda has increased by a threshold percentage is recorded. In one example, the threshold percentage may be a suitable small change in lambda that indicates the engine is responding to the commanded change, such as an increase of 10%, 20%, etc. This time may be referred to as $\tau_0$. At 314, the time constant is determined MA As explained previously, the time constant may be the time from $\tau_0$ at which 63% of the commanded response is reached. $\tau_{95}$ may be the time from $\tau_0$ at which 95% of the commanded response is reached, and, in a first order system, is equivalent to three time constants. At 316, the $3*\tau_{63}$ is compared to a measured $\tau_{95}$.

At 318, it is determined if $3*\tau_{63}$ is approximately equal to the measured $\tau_{95}$. The predicted $\tau_{95}$ (e.g., $3*\tau_{63}$) may deviate from the measured $\tau_{95}$ by a suitable range, such as 5 or 10%. If $3*\tau_{63}$ is different from the measured $\tau_{95}$ by an amount larger than this range, it indicates that the determined $\tau_0$ is in response to an AFR disturbance, and not the actual $\tau_0$ in response to the commanded DFSO entry or exit. Thus, method 300 proceeds to 320 to indicated that an AFR disturbance is present and discard the collected change in lambda. However, if $3*\tau_{63}$ is approximately equal to the measured $\tau_{95}$, an AFR disturbance is not present, and the collected change in lambda during the DFSO entry or exit may be added as a sample to a set of exhaust gas sensor responses at 322. After discarding the collected lambda values at 320 or adding the collected lambda values to the set of responses at 322, method 300 exits.

FIG. 10 illustrates a method 400 for monitoring air-fuel ratio during DFSO. Method 400 may be carried out by controller 12 and/or dedicated controller 140. Method 400 includes, at 402, determining if a threshold number of samples have been collected in the set of exhaust gas sensor responses. The samples may be collected during entry and exit of DFSO, as explained with respect to FIG. 9. The samples may include lambda values collected during the exhaust gas sensor response to the commanded entry or exit of DFSO. For example, each sample may include every lambda value collected during a response to a commanded entry into DFSO, e.g., the sample may include a lambda value collected every 10 ms, or a value collected every 100 ms, etc. The threshold may be a suitable threshold that balances data collection with accurate sensor modeling, and may include 10 samples, 20 samples, etc.

If the threshold number of samples has not been collected, method 400 returns. If the threshold number of samples has been collected, method 400 proceeds to 404 to determine an expected and measured time delay and line length for each sample collected during a DFSO entry. The measured time delay and line length may be calculated as described above with respect to FIGS. 8A and 8B. The expected time delay between the change in the commanded air fuel ratio and the initial exhaust gas sensor response may be determined from several sources of delay. First, there is a delay contribution from the injection-intake-compression-expansion-exhaust cycle. This delay contribution may be proportional to the inverse of the engine speed. Secondly, there is a delay contribution from the time for the exhaust gas to travel from the exhaust port of the engine cylinders to the exhaust gas sensor. This delay contribution may vary with the inverse of the velocity or air mass flow rate of gas in the exhaust passage. Finally, there are delay contributions induced by processing times, the filtering applied to the exhaust gas sensor signal, and the time required for the filtered exhaust gas sensor signal to change the required delta lambda.

The expected line length may be calculated based on the time to reach the final value from the end of the time delay (start of the line length) and the final value, which may be determined based on air mass, velocity of exhaust through the sensor, and other parameters.

At 406, the expected and measured time delay and line length for each sample collected during a DFSO exit is determined, similar to the time delay and line length for the DFSO entry described above. At 408, all entry measured time delays are averaged, all entry measured line lengths are averaged, all entry expected time delays are averaged, and all entry expected line lengths are averaged. Similarly, at 410, the exit measured and expected time delays and line lengths are averaged. Thus, an average measured time delay, an average measured line length, an average expected time delay, and an average expected line length are determined for both rich-to-lean transitions (e.g., entry into DFSO) and lean-to-rich transitions (e.g., exit out of DFSO).

At 412, sensor degradation behavior type is determined based on the average time delays and line lengths calculated previously, which will be described in more detail with respect to FIG. 11. At 414, it is determined if the sensor is exhibiting at least on type of sensor degradation. If no, method 400 exits, as the sensor is not degraded, and thus standard engine operation may continue. If yes, method 400 proceeds to 416 to adjust fuel injection amount and/or timing. To ensure adequate engine control to maintain engine emissions and fuel economy at a desired level, one or more engine operating parameters may be adjusted at 416, if desired. This may include adjusting fuel injection amount and/or timing, and may include adjusting control routines that are based on feedback from the degraded sensor to compensate for the identified degradation. At 418, if the degradation behavior exceeds a threshold, this may indicate the sensor is damaged or otherwise non-functional and as such an operator of the vehicle may be notified of the sensor degradation, for example by activating a malfunction indication light. Upon adjusting operating parameters and/or notifying a vehicle operator, method 400 exits.

FIG. 11 is a flow chart illustrating a method 500 for determining a sensor degradation behavior based on determined and expected time delays and line lengths during exit and entry into DFSO. Method 500 may be carried out by controller 12 and/or dedicated controller 140, and may be executed during 412 of method 400 described above. At 502, method 500 includes comparing measured entry time delay and exit time delay to the expected entry time delay and exit time delay. As explained with respect to FIG. 10, for both entry into and exit out of DFSO, the average measured time delay and average expected time delay may be determined. Each measured time delay may be compared to its respective expected time delay to determine a difference in the time delays.

At 504, it is determined if both the entry and exit time delays are greater than their respective expected time delays by a threshold amount. The threshold amount may be a suitable amount, such as 5% or 10%, that allows for some variation in the exhaust gas sensor response that does not affect drivability or emissions, and allows for error in the expected time delays. If both the entry and exit time delays are greater than their respective expected time delays, a symmetric delay degradation behavior is indicated at 506, and method 500 proceeds to 508. If both are not greater than their respective expected time delays, method 500 also proceeds to 508 to determine if one of the entry or exit time delays is greater than its respective expected time delay. If no, method 500 proceeds to 512. If yes, method 500 proceeds to 510 to indicate an asymmetric delay degradation. If the entry time delay is greater than expected, a rich-to-lean delay degradation is indicated. If the exit time delay is greater than expected, a lean-to-rich delay degradation is indicated. Method 500 then proceeds to 512.

At 512, the measured entry line length is compared to the expected entry line length, and the measured exit line length is compared to the expected exit line length. At 514, it is determined if both the entry and exit line lengths are greater than their respective expected line lengths by a threshold amount, similar to the determination made at 504. If both are greater than expected, method 500 proceeds to 516 to indicate a symmetric filter degradation, and then method 500 proceeds to 518. If no, method 500 proceeds to 518 to determine if one of the entry or exit line lengths is greater than its respective expected line length.

If it is determined that one of the entry or exit line lengths is greater than expected, method 500 proceeds to 520 to indicate an asymmetric filter degradation. If the entry line length is greater than expected, a rich-to-lean filter degradation is indicated. If the exit line length is greater than expected, a lean-to-rich filter degradation is indicated. Method 500 then proceeds to 522. Also, if the answer is no at 518, method 500 proceeds to 522 to determine if at least one degradation behavior is indicated, based on the previous comparisons of the time delays and line lengths. If at least one degradation behavior is indicated, method 500 exits. If no degradation is indicated, method 500 proceeds to 524 to indicate no degradation behavior, and then method 500 exits.

Thus, the methods presented herein provide for determining exhaust gas sensor degradation based on a time delay and line length of a set of exhaust gas sensor responses collected during commanded changes in lambda. These commanded changes in lambda may be entry into and exit out of DFSO. Further, the collected lambda values during the commanded change in lambda may be monitored to determine if an air-fuel ratio disturbance is present prior to the commanded change in lambda. If so, those collected lambda values may be discarded so as to reduce noise that may confound the accurate degradation determination. The air-fuel ratio disturbance may be detected by determining a time constant of the sensor response, and estimating a threshold response time based on the time constant. If the estimated threshold response time is different from a measured response time, then a disturbance may be indicated.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor coupled in an engine exhaust, comprising:
   indicating exhaust gas sensor degradation based on a time delay and line length of each sample of a set of exhaust gas sensor responses collected during each of entry into and exit out of deceleration fuel shut-off (DFSO).

2. The method of claim 1, wherein during entry into DFSO, an engine is commanded from stoichiometric operation to lean operation.

3. The method of claim 1, wherein during exit out of DFSO, an engine is commanded from lean operation to stoichiometric operation.

4. The method of claim 1, further comprising, for each sample of the set of exhaust gas sensor responses, determining if an air-fuel ratio disturbance is present prior to the entry into DFSO.

5. The method of claim 4, wherein,
   if an air-fuel ratio disturbance is present, then not including that exhaust sample in the set of exhaust gas sensor responses; and
   if an air-fuel ratio disturbance is not present, then including that sample in the set of exhaust gas sensor responses.

6. The method of claim 4, wherein the time delay is a duration from commanded entry into DFSO to a threshold change in lambda, and wherein the line length is based on a change of lambda over time during the exhaust gas sensor response.

7. The method of claim 6, further comprising:
if an average time delay of exhaust gas sensor responses during DFSO entry exceeds an expected entry time delay, and an average time delay of exhaust gas sensor responses during DFSO exit does not exceed an expected exit time delay, indicating a rich-to-lean delay sensor degradation.

8. The method of claim 6, further comprising:
if an average line length of exhaust gas sensor responses during DFSO entry exceeds an expected entry line length and an average line length of exhaust gas sensor responses during DFSO exit does not exceed an expected exit line length, indicating a rich-to-lean filter sensor degradation.

9. The method of claim 6, further comprising:
if an average time delay of exhaust gas sensor responses during DFSO entry exceeds an expected entry time delay and an average time delay of exhaust gas sensor responses during DFSO exit exceeds an expected exit time delay, indicating a symmetric delay sensor degradation.

10. The method of claim 1, further comprising, for each sample of the set of exhaust gas sensor responses, determining if an air-fuel ratio disturbance is present prior to exit out of DFSO.

11. The method of claim 10, wherein,
if an air-fuel ratio disturbance is present, then not including that exhaust sample in the set of exhaust gas sensor responses; and
if an air-fuel ratio disturbance is not present, then including that sample in the set of exhaust gas sensor responses.

12. The method of claim 10, wherein the time delay is a duration from a commanded exit out of DFSO to a threshold change in lambda, and wherein the line length is based on a change of lambda over time during the exhaust gas sensor response.

13. The method of claim 12, further comprising:
if an average time delay of exhaust gas sensor responses during DFSO exit exceeds an expected exit time delay and an average time delay of exhaust gas sensor responses during DFSO entry does not exceed an expected entry time delay, indicating a lean-to-rich delay sensor degradation.

14. The method of claim 12, further comprising if an average line length of exhaust gas sensor responses during DFSO exit exceeds an expected exit line length and an average line length of exhaust gas sensor responses during DFSO entry does not exceed an expected entry line length, indicating a lean-to-rich filter sensor degradation.

15. The method of claim 12, further comprising if an average line length of exhaust gas sensor responses during DFSO exit exceeds an expected exit line length and an average line length of exhaust gas sensor responses during DFSO exit exceeds an expected entry line length, indicating a symmetric filter sensor degradation.

16. The method of claim 1, further comprising adjusting a fuel injection amount based on the indicated degradation, where said degradation includes asymmetric sensor responses to air-fuel ratio excursions.

17. The method of claim 1, further comprising adjusting a fuel injection timing based on the indicated degradation, where said degradation includes asymmetric sensor responses to air-fuel ratio excursions.

18. A system for a vehicle, comprising:
an engine including a fuel injection system;
an exhaust gas sensor coupled in an exhaust system of the engine; and
a controller including instructions executable to:
for each entry into and exit out of DFSO, if an air-fuel ratio disturbance is not present prior to the entry or exit, then add a collected change in lambda over time during the entry or exit to a set of exhaust gas sensor responses;
indicate exhaust gas sensor degradation based on a time delay and line length of each sample of the set of exhaust gas sensor responses; and
adjust a fuel injection amount and/or timing based on the indicated degradation.

19. The system of claim 18, wherein the instructions are further executable to notify an operator of the vehicle if the indicated sensor degradation exceeds a threshold.

20. The system of claim 18, wherein the instructions are further executable, for each exit and entry, to determine a time constant from the collected change in lambda and determine predicted threshold response time based on the time constant.

21. A method of monitoring an oxygen sensor coupled in an engine exhaust, comprising:
collecting a set of exhaust gas sensor responses during entry into and exit out of DFSO;
based on the set of exhaust gas sensor responses,
indicating an asymmetric delay sensor degradation if one of an average entry or exit time delay exceeds a respective expected entry or exit delay;
indicating an asymmetric filter sensor degradation if one of an average entry or exit line length exceeds a respective expected entry or exit line length; and
adjusting a fuel injection amount based on an indicated sensor degradation, wherein the indicating includes generating an indication light.

* * * * *